United States Patent
Kokkonen (10) Patent No.: US 11,554,831 B2
(45) Date of Patent: Jan. 17, 2023

(54) ARRANGEMENT FOR A BICYCLE FRAME AND METHOD OF MANUFACTURE

(71) Applicant: POLE BICYCLE COMPANY OY, Muurame (FI)

(72) Inventor: Leo Kokkonen, Jyväskylä (FI)

(73) Assignee: POLE BICYCLE COMPANY OY, Muurame (FI)

( * ) Notice: Subject to any disclaimer, the term of this patent is extended or adjusted under 35 U.S.C. 154(b) by 0 days.

(21) Appl. No.: 17/602,654

(22) PCT Filed: Apr. 9, 2020

(86) PCT No.: PCT/EP2020/060195
§ 371 (c)(1),
(2) Date: Oct. 8, 2021

(87) PCT Pub. No.: WO2020/208158
PCT Pub. Date: Oct. 15, 2020

(65) Prior Publication Data
US 2022/0144377 A1    May 12, 2022

(30) Foreign Application Priority Data
Apr. 11, 2019 (FI) ..................................... 20195294

(51) Int. Cl.
*B62K 25/26* (2006.01)
*B62K 25/28* (2006.01)

(52) U.S. Cl.
CPC ............ *B62K 25/26* (2013.01); *B62K 25/286* (2013.01)

(58) Field of Classification Search
CPC ....... B62K 25/26; B62K 25/286; B62K 25/10

USPC .................................................... 280/28, 284
See application file for complete search history.

(56) References Cited

U.S. PATENT DOCUMENTS

| 4,813,697 A * | 3/1989 | Takada ................. B62K 25/283 |
| | | 180/227 |
| 6,170,845 B1 | 1/2001 | Tseng |
| 10,752,316 B2 * | 8/2020 | Klieber ................. B62K 19/34 |
| 10,850,796 B2 * | 12/2020 | Chamberlain ........... B62K 3/02 |

(Continued)

FOREIGN PATENT DOCUMENTS

| FR | 2872776 | 1/2006 |
| FR | 3014076 | 6/2015 |

(Continued)

OTHER PUBLICATIONS

International Search Report for PCT/EP2020/060195, dated Jul. 1, 2020, 3 pages.

(Continued)

*Primary Examiner* — Tony H Winner
(74) *Attorney, Agent, or Firm* — Nixon & Vanderhye (57) ABSTRACT

An arrangement for a bicycle frame including two rear frame members, each rear frame member including at least one first connection point at the front of each rear frame member, and one other connection point at the back of the rear frame member for a wheel, the at least one first connection point including a component for facilitating connection of the rear frame members via an axle, and the axle interlocking the rear frame members in a fixed position to each other. A bicycle frame and a corresponding method of manufacture and method of assembly are also presented.

20 Claims, 7 Drawing Sheets

(56) References Cited

U.S. PATENT DOCUMENTS

| | | | | |
|---|---|---|---|---|
| 11,014,610 B2* | 5/2021 | Bierbaumer | ......... | B62D 29/004 |
| 2005/0206122 A1* | 9/2005 | Ichihara | ............... | B62K 25/283 |
| | | | | 180/227 |
| 2008/0238030 A1* | 10/2008 | Tseng | .................. | G06F 30/3312 |
| | | | | 280/284 |
| 2015/0175239 A1* | 6/2015 | Lumpkin | ............... | B62K 19/00 |
| | | | | 280/284 |
| 2018/0265164 A1 | 9/2018 | Li et al. | | |

FOREIGN PATENT DOCUMENTS

| | | |
|---|---|---|
| JP | 2015-020582 | 2/2015 |
| NL | 1031923 | 12/2007 |

OTHER PUBLICATIONS

Written Opinion of the ISA for PCT/EP2020/060195, dated Jul. 1, 2020, 5 pages.
Office Action issued in FI20195294, dated Sep. 11, 2019, 5 pages.
Search Report issued in FI20195294, dated Sep. 11, 2019, 1 page.
Communication of Acceptance for FI20195294, dated Jan. 17, 2020.

* cited by examiner

ARRANGEMENT FOR A BICYCLE FRAME AND METHOD OF MANUFACTURE

This application is the U.S. national phase of International Application No. PCT/EP2020/060195 filed 9 Apr. 2020 which designated the U.S. and claims priority to FI Patent application No. 20195295 filed 11 Apr. 2019, the entire contents of each of which are hereby incorporated by reference.

BACKGROUND OF THE INVENTION

Field of the Invention

Generally, the present invention relates to vehicle frame structures and arrangements thereof. Particularly, however not exclusively, the present invention pertains to an arrangement for a bicycle frame and method of manufacture thereof.

Description of the Related Art

Current bicycle rear frames, especially in the context of mountain bikes, have different rear frames wherein the rear triangle may take various forms and be coupled to the front frame via various link and suspension arrangements. However, the rear triangle itself causes design limitations to the rear frame and usually yields limited space at the rear triangle. Increasing the size of the rear triangle leads to a heavier rear frame design, which is not preferred, since weight-strength optimization is a key design goal in high performance bike design.

The rear frames have to be designed for sufficient stiffness such that the axle point between the rear frame and the front frame has to endure fewer forces. Consequent axle points between the rear frame and the front frame are usually not stiff and may be prone to mechanical failure. Further, the rear frame triangles are bulky, which is logistically difficult, and in case of failure, the whole of rear frame has to be completely replaced for a new one.

Prior art publication U.S. Pat. No. 6,170,845 B1 discloses a bicycle frame for providing a damping capability, which frame has a rear part consisting of two chain stays that are pivotally connected at their proximal ends to the downtube of the bicycle frame. Other solutions for bicycle rear frames may be found in publications US 2018265164 AA, FR 3014076 A1 and NL 1031923 C1 representing the general state of art.

SUMMARY OF THE INVENTION

The objective of the embodiments of the present invention is to at least alleviate one or more of the aforementioned drawbacks evident in the prior art arrangements particularly in the context of bicycle frame arrangements.

The objective is generally achieved with an arrangement, bicycle frame and method in accordance with the present disclosure.

An advantage of the present invention is that it allows a bicycle frame structure, which has a rear frame that has changeable sides.

Another advantage of the present invention is that it allows for the use of large bearings at the pivoting points between the front frame and the rear frame.

Another advantage of the present invention is that the solution yields a rear frame design with less material since a bridge of material between the two sides of a rear triangle is replaced by at least one connecting axle.

The present invention is especially beneficial in mountain bike frames that has a pivoting joint or link system between the front frame and the rear frame.

In accordance with one aspect of the present invention an arrangement for a bicycle frame comprising
  two separate rear frame members,
  each rear frame member comprising at least one first connection point at the front of each rear frame member, and one other connection point at the back of the rear frame member for a wheel,
  characterised in that the at least one first connection point comprising means for facilitating connection of the rear frame members via an axle, and
  said axle interlocking the rear frame members in a fixed position to each other.

According to an exemplary embodiment of the present invention the rear frame members are removably connected with the at least one axle.

According to an exemplary embodiment of the present invention the at least one axle providing for interlocking of the rear frame members is coupled to the rear frame with mating connection.

According to an exemplary embodiment of the present invention at least one of the axles facilitates pivotable connection for a link system.

According to an exemplary embodiment of the present invention the arrangement comprises also second connection points and a second axle connected to the second connection points.

According to an exemplary embodiment of the present invention the at least one of the axles connects the rear frame members to at least one pivoting point.

According to an exemplary embodiment of the present invention the first connection points are situated at the front part of the rear frame members.

According to an exemplary embodiment of the present invention the back parts of the rear frame members are connected to the wheel.

According to an exemplary embodiment of the present invention each rear frame member has the shape of a closed triangle with one point of connection at back of the rear frame member and two separate ends at the front of the rear frame member whereat at least one axle is connected.

In accordance with one aspect of the present invention a bicycle frame comprising an arrangement for a bicycle frame is connected to a front frame via link joints.

In accordance with one aspect of the present invention a method for manufacturing a bicycle rear frame member comprising
  producing a closed triangle rear frame member forming a solid part,
  producing a connection point to the back of the rear frame member whereat the rear frame member may be connected to a wheel,
  characterised in that producing a first connection point at the front of the rear frame member whereat the rear frame member may be connected to an axle and via the axle to another rear frame member, and wherein the first connection point is such that it allows the rear frame member to be fixed in a position in relation to the axle.

In accordance with one aspect of the present invention a bicycle rear frame member manufactured by the disclosed method.

As briefly reviewed hereinbefore, the utility of the different aspects of the present invention arises from a plurality of issues depending on each particular embodiment.

The expression "bicycle" is herein used to refer to various wheel-based vehicles for a number of users, which may be manually or motor-powered or a combination of the aforementioned, and it is meant to encompass also unicycles, tricycles quadracycles, and the like. In a broader sense, the expression may be also seen as to encompass motorbikes.

The expression "a number of" may herein refer to any positive integer starting from one (1). The expression "a plurality of" may refer to any positive integer starting from two (2), respectively.

The term "exemplary" refers herein to an example or example-like feature, not the sole or only preferable option.

Different embodiments of the present invention are also disclosed and claimed.

BRIEF DESCRIPTION OF THE DRAWINGS

Some exemplary embodiments of the present invention are reviewed more closely with reference to the attached drawings, wherein.

DETAILED DESCRIPTION OF THE EMBODIMENTS

Figure 1:
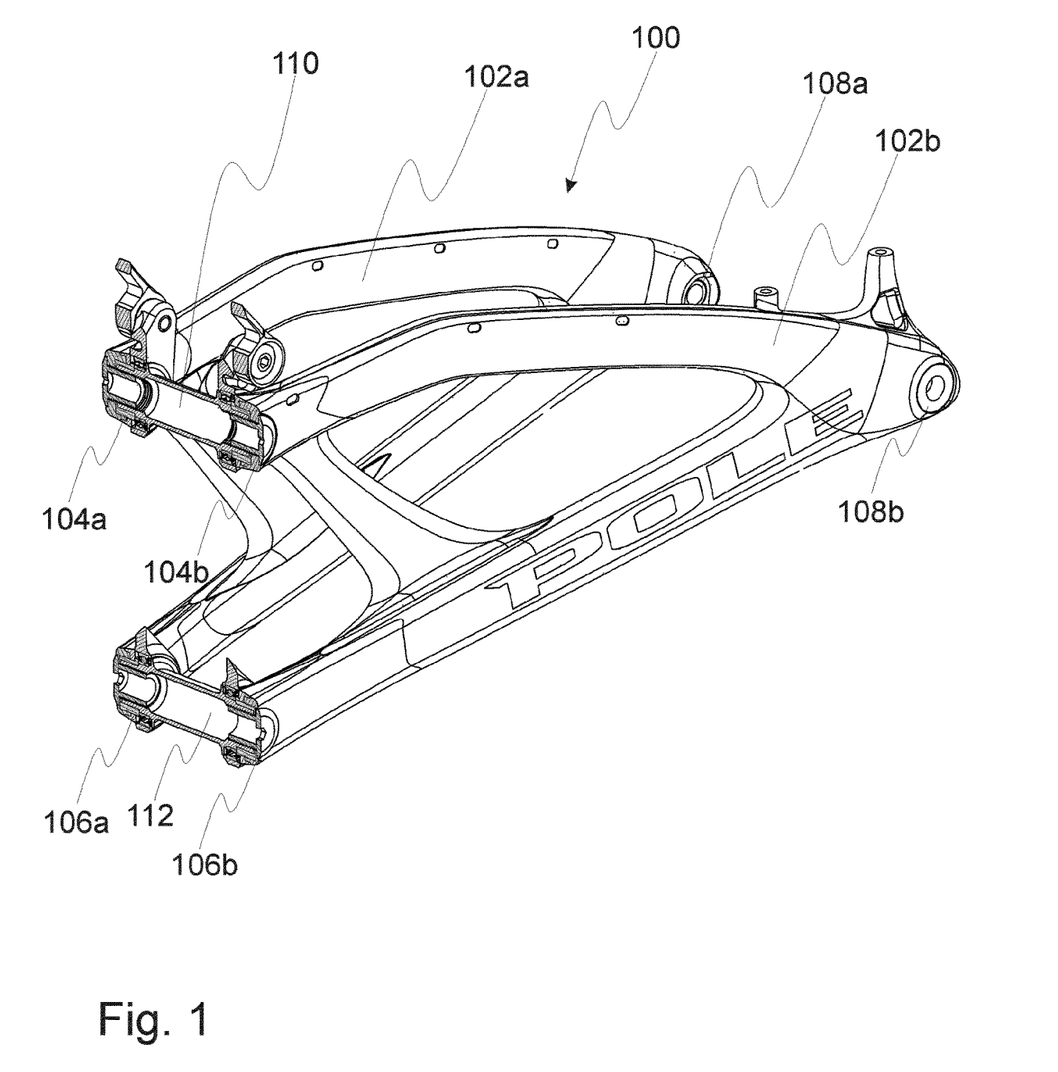
FIG. 1 depicts a partial cutaway view of an embodiment of the arrangement in accordance with the present invention.

FIG. 1 depicts a partial cutaway view of an embodiment of the arrangement (100) in accordance with the present invention.

The embodiment of the arrangement comprises two rear frame members (102a, 102b), which are connected to each other at a first connection point (104a, 104b) and at a second connection point (106a, 106b) by the axles (110, 112) arranged at the connection points (104a, 104b, 106a, 106b). The rear frame members (102a, 102b) further comprise third connection points (108a, 108b) for attaching a (rear) wheel and transmission components, such as a cogset, chain derailleur.

Optionally the two rear frame members (102a, 102b) of the arrangement comprise and are connected to each other at only a first connection point (104a, 104b) by a single axle (110). Therein the first connection point (104a, 104b) at each rear frame member (102a, 102b) and the axle (110) connecting them are sufficient to form a rear triangle without another axle connecting the two rear frame members (102a, 102b). Alternatively, more than two connection points at the front of the rear frame members (102a, 102b) may be used for more than two axles to connect the rear frame members (102a, 102b) to each other and to pivoting arrangements, links or shock absorbers thereof.

At least one of the axles (110, 112) interlock the rear frame members (102a, 102b) in a position in relation to each other. Further the axles (110, 112) facilitate connection to a front frame (130) of a bicycle frame via link system (124, 126). The axles (110, 112) rear frame members (102a, 102b) in a position in relation to each other but simultaneously they facilitate the vertical or pivotal movement of the rear frame members such as that the movement of the rear frame members (102a, 102b) is also synchronized.

Figure 2:
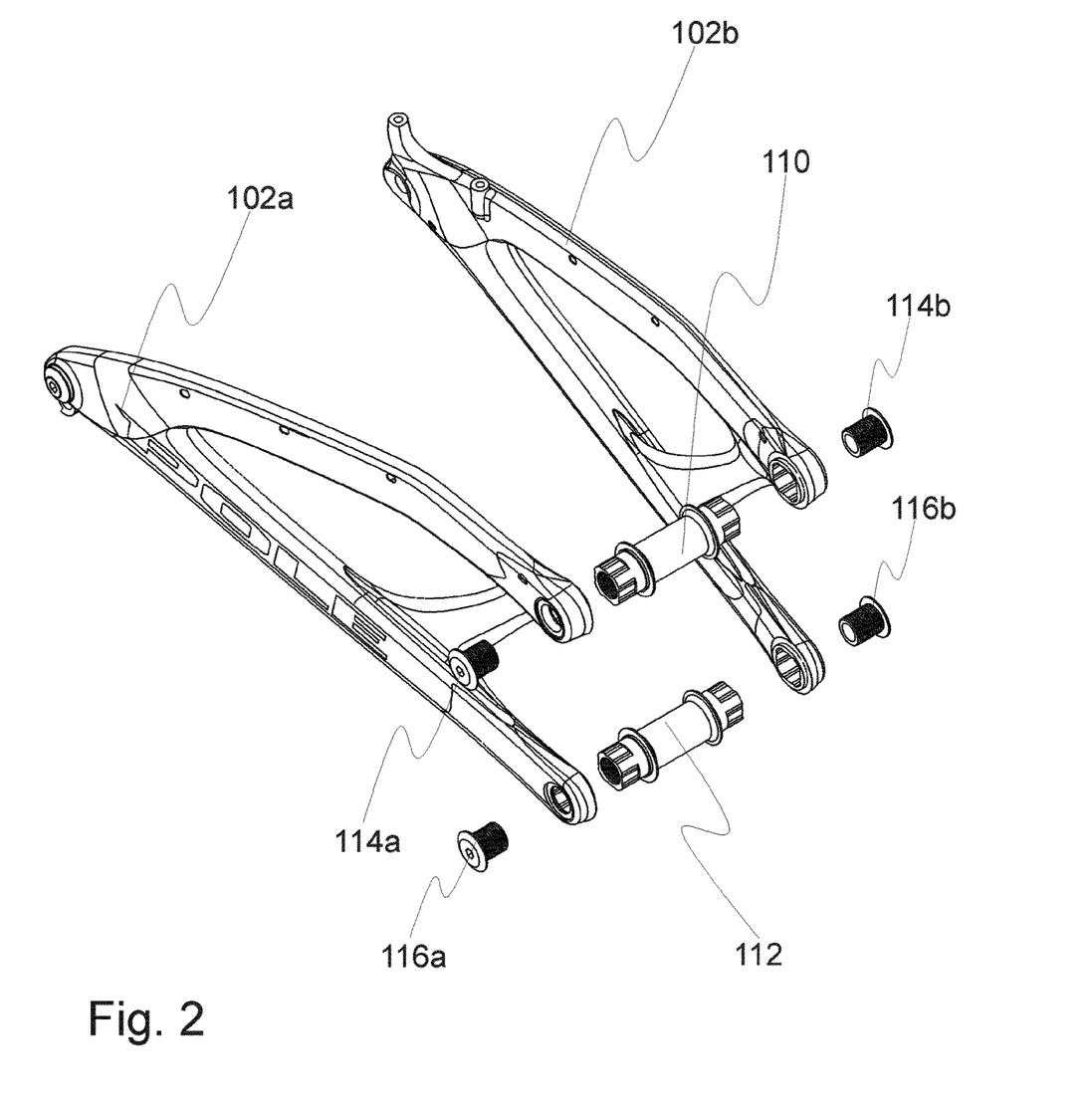
FIG. 2 depicts an exploded view drawing of an embodiment of the arrangement in accordance with the present invention.

FIG. 2 depicts an exploded view drawing of an embodiment of the arrangement (100) in accordance with the present invention As depicted in this embodiment, the axles (110, 112) may be removably connected to the rear frame members (102a, 102b). This connection may be facilitated by screw-like members (114a, 114b, 116a, 116b) as depicted. The removable connection and the screw-like fastening thereof allows for fast connection and removal of the rear frame members (102a, 102b), which is beneficial e.g. when either of the rear frame members (102a, 102b) gets damages and needs to be changed. Many such similar fastening means may be used. Further, the fastening means may be hand-operable such that no tools are required.

Although not explicitly depicted, the fastening for attaching a (rear) wheel and transmission at the third connection points (108a, 108b) may be facilitated via locking skewers or the like.

Figure 3A:
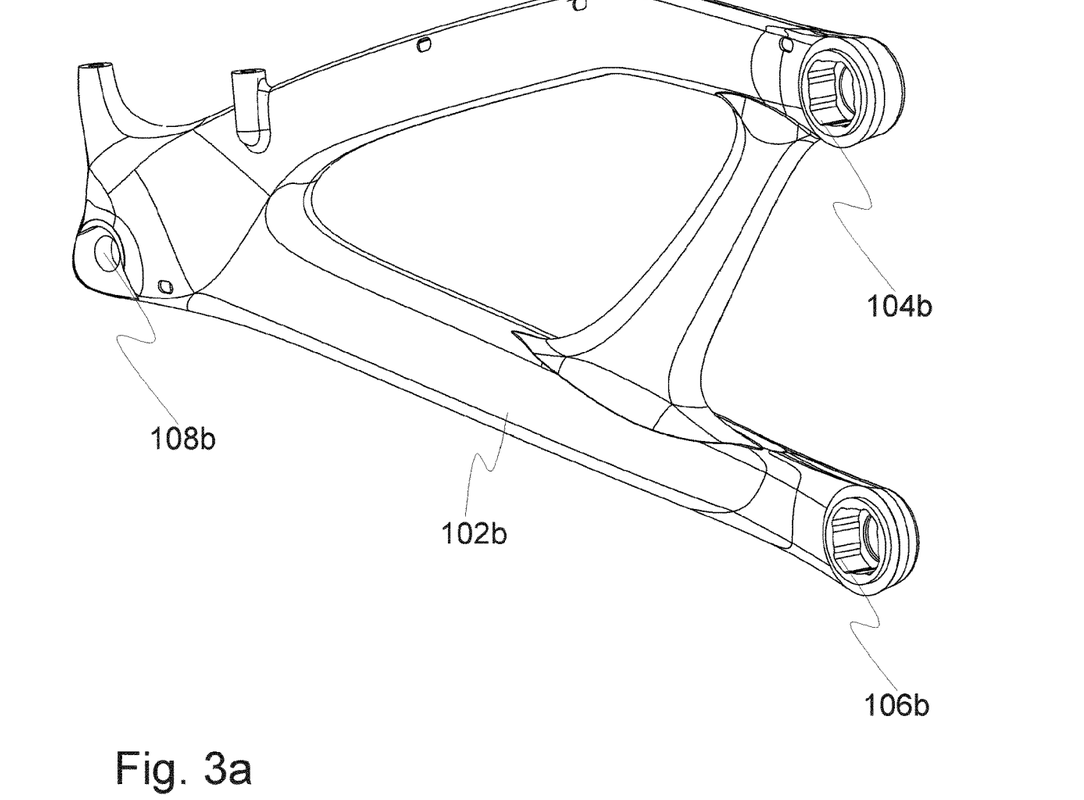
FIGS. 3a and 3b depict aspects of the connection points of an embodiment of the arrangement in accordance with the present invention.
Figure 3B:
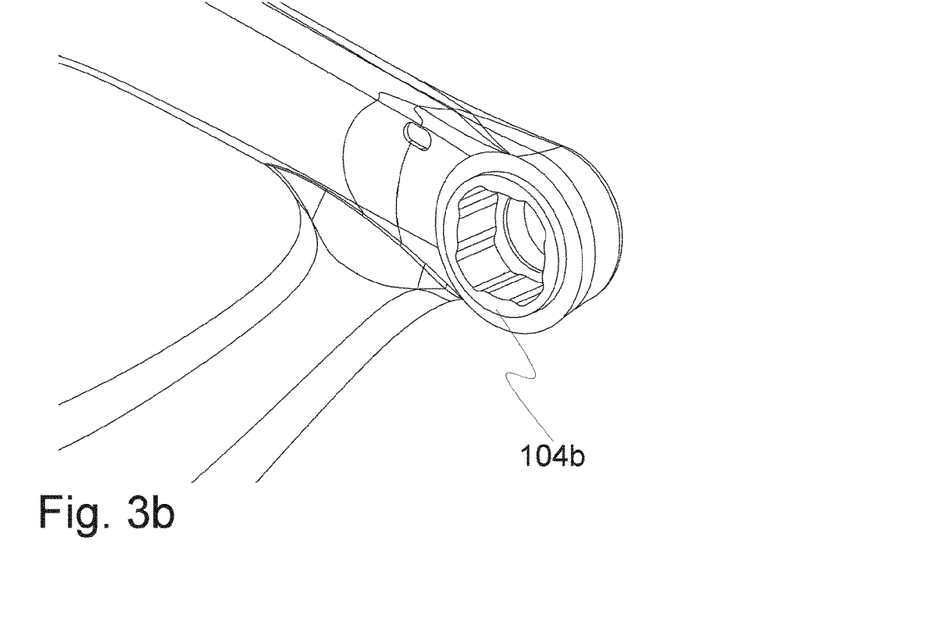

FIGS. 3a and 3b depict aspects of the connection points of an embodiment of the arrangement (100) in accordance with the present invention.

The first connection points (104a, 104b) and/or the second connection points (106a, 106b) may comprise grooves or other such structures for facilitating mating connection between at least one of the axles (110, 112) and the first connection points (104a, 104b) and/or the second connection points (106a, 106b). Such mating connection may be used to interlock the rear frame members (102a, 102b) to a position in relation to each other so that the rear frame members (102a, 102b) won't move in relation to each other but only via the turning of the at least one (110, 112) in relation to a front frame (130) or link system therebetween to which the at least one axle (110, 112) is connected.

Figure 4:
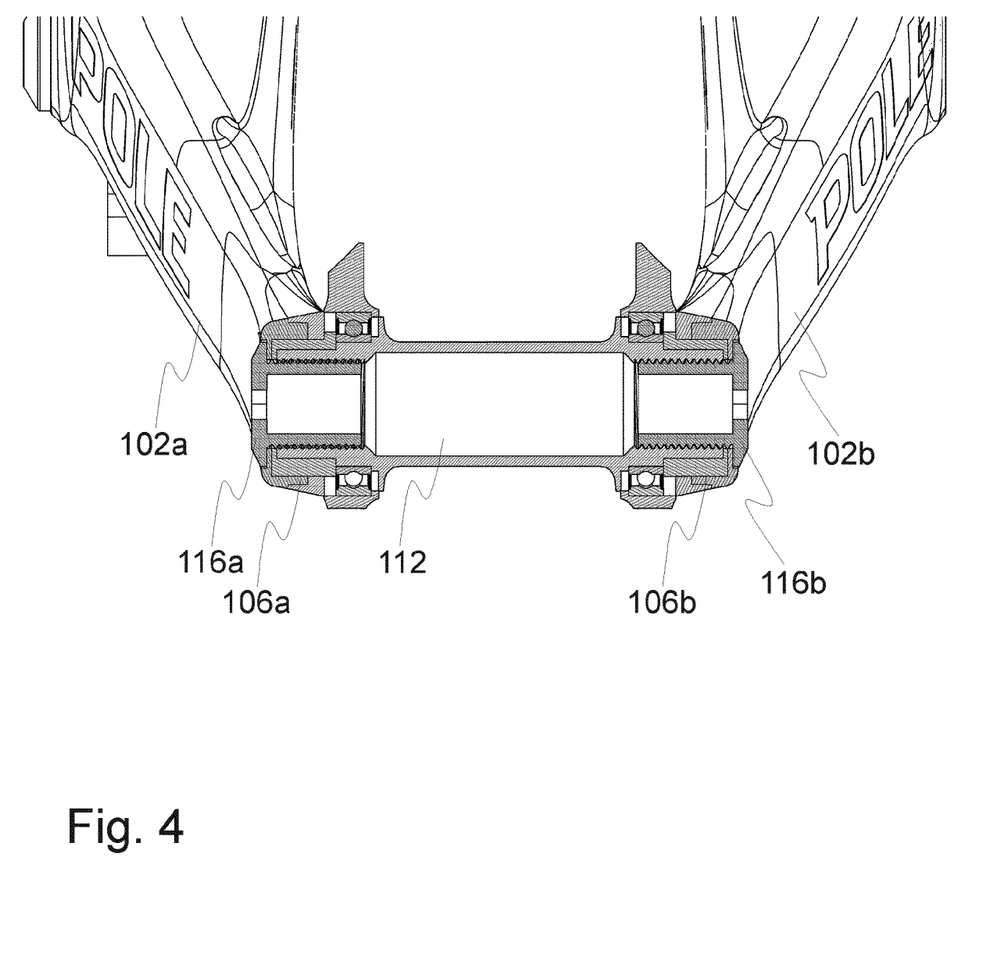
FIG. 4 depicts a cross-sectional view of an embodiment of the arrangement in accordance with the present invention.

FIG. 4 depicts a cross-sectional view of an embodiment of the arrangement (100) in accordance with the present invention.

The connection of the rear frame members (102a, 102b) at the corresponding connection points (106a, 106b) by the axle (112) and fastening screw-like members (116a, 116b) is shown in detail. The axle (112) as well as the fastening screw-like members (116a, 116b) may be partly hollow for reduced weight. The function of the axle (112) is to connect the two rear frame members (102a, 102b) to each other such that the two rear members (102a, 102b) may be manufactured independently without any physical connection therebetween. The axle (112) interlocks the two rear frame members (102a, 102b) to each other and further carries forces induced to the rear frame members (102a, 102b) when in use such that the axle (112) (together with other axles and connection of the rear wheel) produce a bridge between the rear frame members (102a, 102b) closing the rear frame members (102a, 102b) via the axles into a rear triangle (excluding the seat tube).

As depicted, the axles (110, 112) may comprise bearing arrangements between axles (110, 112) and the links (124, 126), which links (124, 126) connect the rear frame members (102a, 102b) and axles (110, 112) to the front frame (130) of a bicycle. This way the connection between the links (124, 126) and the axles may be pivotable and the rear frame as a whole may pivot in relation to the front frame (130) of the bicycle.

Figure 5A:
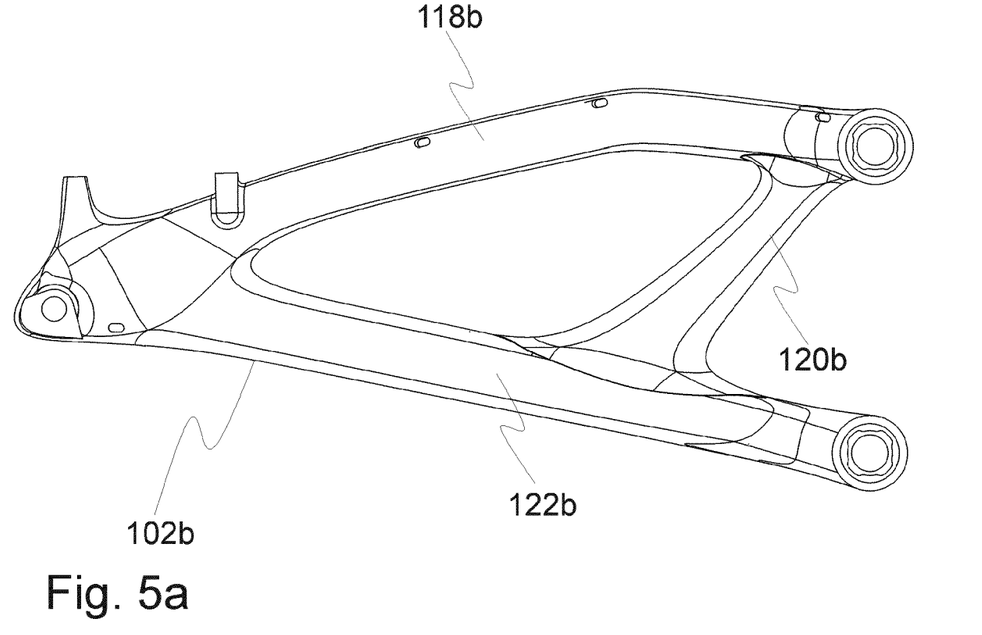
FIGS. 5a and 5b depict aspects of the rear frame members of an embodiment of the arrangement in accordance with the present invention.
Figure 5B:
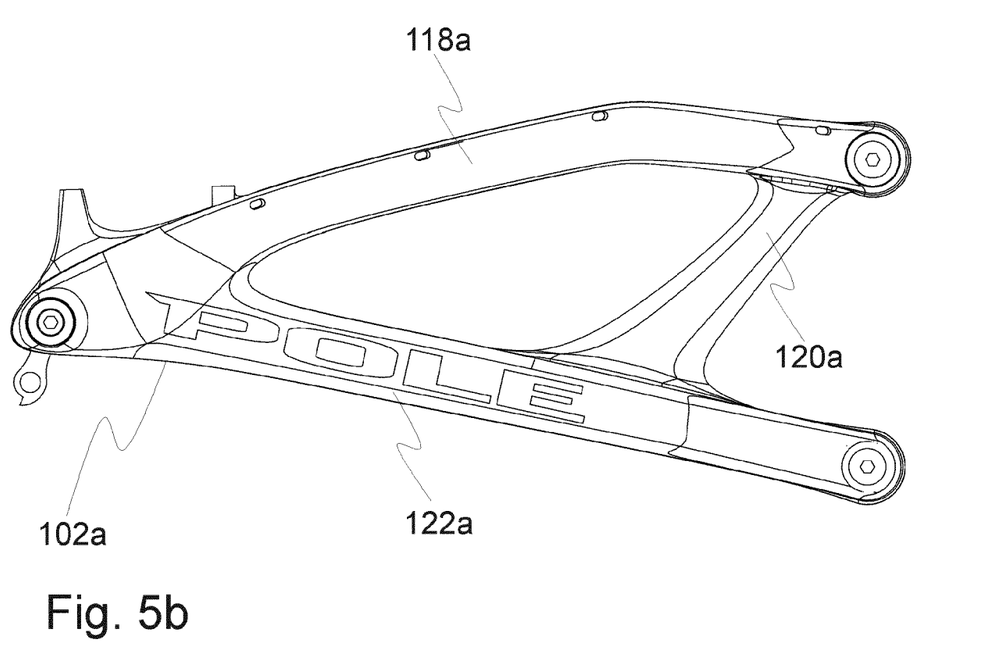

FIGS. 5a and 5b depict aspects of the rear frame members of an embodiment of the arrangement (100) in accordance with the present invention.

The rear frame members (102a, 102b) are preferably essentially in the shape of a closed triangle. As depicted, the connection points (104a, 104b, 106a, 106b, 108a, 108b) needn't form the end points of the vertices (118a, 118b, 120a, 120b, 122a, 122b) of the triangle. The essentially horizontal vertices (118a, 118b, 120a, 120b) of the rear frame members (102a, 102b) are supported by the essentially vertical vertices (122a, 122b). The essentially vertical vertices (122a, 122b) are preferably close to the front end of the rear frame members (102a, 102b), i.e. close to the first connection (104a, 104b) points and second connection points (106a, 106b). However, in relation to the strength and material property requirements of the rear frame members (102a, 102b) also other arrangements of the vertices (118a, 118b, 120a, 120b, 122a, 122b) are possible.

The vertices of the rear frame members (102a, 102b) may be curvilinear as depicted or they may linear.

The connection points (104a, 104b, 106a, 106b) for the axles are preferably situated at the front part of the rear frame members (102a, 102b). The connection points (108a, 108b) for the rear wheel and transmission arrangements thereof are preferably situated at the rear part of the rear frame members.

Various materials may be used for manufacturing the rear frame members (102a, 102b). Some examples include carbon fibre and other such suitable composites, as well as aluminum, steel and various known alloys.

Figure 6:
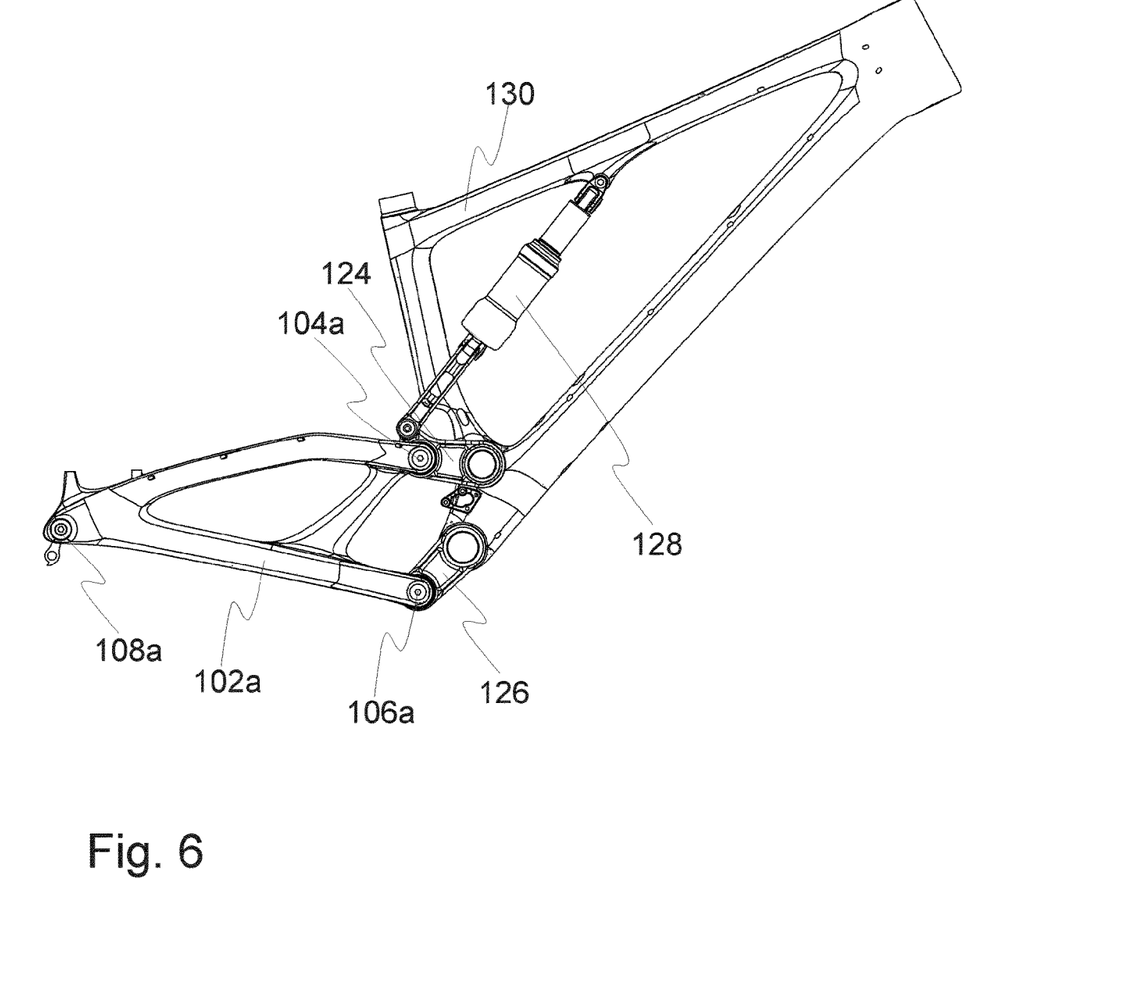
FIG. 6 depicts a general view of the use of an embodiment of the arrangement in accordance with the present invention in a bicycle frame arrangement.

FIG. 6 depicts a general view of the use of an embodiment of the arrangement (100) in accordance with the present invention in a bicycle frame arrangement.

The rear frame members (102a, 102b) may be connected to a front frame (130) of a bicycle via the axles (110, 112) and optionally link arrangements facilitated between the axles and the links (124, 126). Typically also a suspension is facilitated via a link, which suspension in this embodiment is facilitated by a shock absorber between a point of connection (link) at an axle (110, 112) or either or both of the rear frame members (102a, 102b) and another point of connection (link) at the front frame (130). Any of the points of connection may be pivotable and situated in accordance with preference and/or different requirements set for the design of the bicycle overall.

Figure 7:
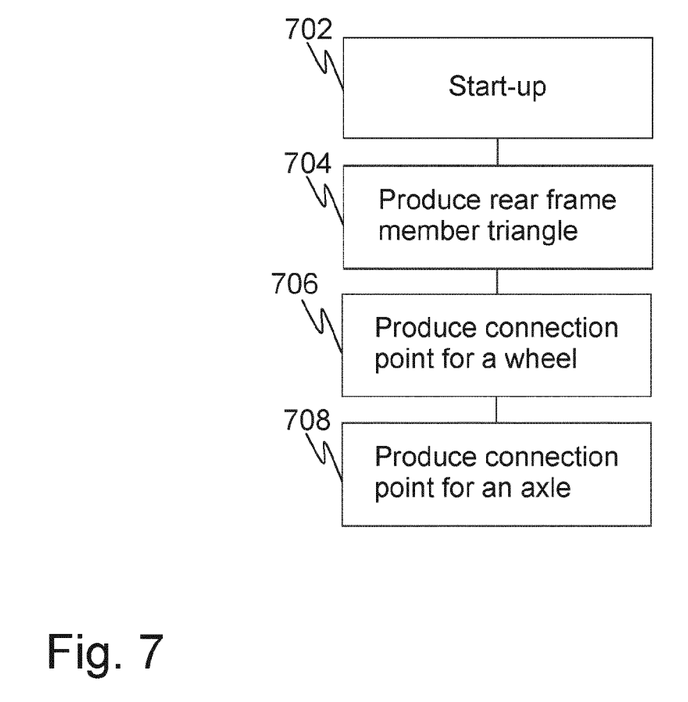
FIG. 7 depicts a flow diagram illustrating an embodiment of the method in accordance with the present invention.

FIG. 7 depicts a flow diagram illustrating an embodiment of the method in accordance with the present invention.

At 702, referred to as the start-up the manufacturing machine parameters may be set in light of the preferred design, used materials, etc.

At 704, a triangular rear frame member is produced as a solid part.

At 706, the triangular rear frame member is produced a connection point for a wheel preferably to the rear end of the rear frame member. The connection point may be directly manufactured with the rear frame member or machined afterward e.g. by drilling.

At 708, the triangular rear frame member is produced a connection point for a connecting axle preferably to the front end of the rear frame member. The connection point may be directly produced with the rear frame member or machined afterward e.g. by drilling. The connection point for an axle is preferably added with mating connection means that allow the rear frame member to be interlocked to an axle and in relation to the rotation of the axle. In some embodiments, more connection points for additional axles may be produced. A connection point for an axle may be further fitted with a housing for an axle.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. An arrangement for a bicycle frame, comprising:
   two separate rear frame members,
      each rear frame member of the two rear frame members comprising a first connection point at a front of the rear frame member, and a back connection point at a back of the rear frame member for a wheel,
      wherein the first connection point comprises means for facilitating a connection of the two rear frame members via an axle, and
      said axle is configured for interlocking the two rear frame members in a fixed position to each other.

2. The arrangement of claim 1, wherein the two rear frame members are removably connected with the axle.

3. The arrangement of claim 2, wherein the two rear frame members each further comprise a second connection point, said second connection points connected to a second axle.

4. The arrangement of claim 2, wherein the axle providing for interlocking of the two rear frame members is coupled to the two rear frame members with a mating connection.

5. The arrangement of claim 2, wherein of the axle is configured to facilitate a pivotable connection to a link system.

6. The arrangement of claim 2, wherein the axle is one of a plurality of axles that connects the two rear frame members to at least one pivoting point.

7. The arrangement of claim 1, wherein the two rear frame members each further comprise a second connection point, said second connection points connected to a second axle.

8. The arrangement of claim 7, wherein the axle providing for interlocking of the two rear frame members is coupled to the two rear frame members with a mating connection.

9. The arrangement of claim 7, wherein of the axle is configured to facilitate a pivotable connection to a link system.

10. The arrangement of claim 7, wherein the axle is one of a plurality of axles that connects the two rear frame members to at least one pivoting point.

11. The arrangement of claim 1, wherein the axle providing for interlocking of the two rear frame members is coupled to the two rear frame members with a mating connection.

12. The arrangement of claim 11, wherein of the axle is configured to facilitate a pivotable connection to a link system.

13. The arrangement of claim 11, wherein the axle is one of a plurality of axles that connects the two rear frame members to at least one pivoting point.

14. The arrangement of claim 1, wherein the axle is configured to facilitate a pivotable connection to a link system.

15. The arrangement of claim 1, wherein the axle is one of a plurality of axles that connects the two rear frame members to at least one pivoting point.

16. The arrangement of claim 3, wherein the second connection points of the two rear frame members are situated at the front of the rear frame members.

17. The arrangement of claim 3, wherein each of the two rear frame members is shaped as a closed triangle with two separate ends at the front of the rear frame member, the axle being connected at a first of the two separate ends and the second axle connected at a second of the two separate ends.

18. A bicycle frame comprising an arrangement of claim 1 connected to a front frame via link system.

19. A method for manufacturing a bicycle rear frame member, comprising:
   producing a closed triangle rear frame member forming a solid part;
   producing a back connection point at a back of the rear frame member whereat the rear frame member may be connected to a wheel; and
   producing a first connection point at a front of the rear frame member whereat the rear frame member may be connected to an axle and via the axle to another rear frame member, the first connection point arranged to allow the rear frame member to be fixed in a position in relation to the axle.

20. A bicycle rear frame member manufactured by the method of claim 19.

* * * * *